Sept. 13, 1955  A. R. FLINK  2,717,783
SELF-SUPPORTING MATERIAL DISTRIBUTING ATTACHMENT
Filed July 23, 1951  7 Sheets-Sheet 1
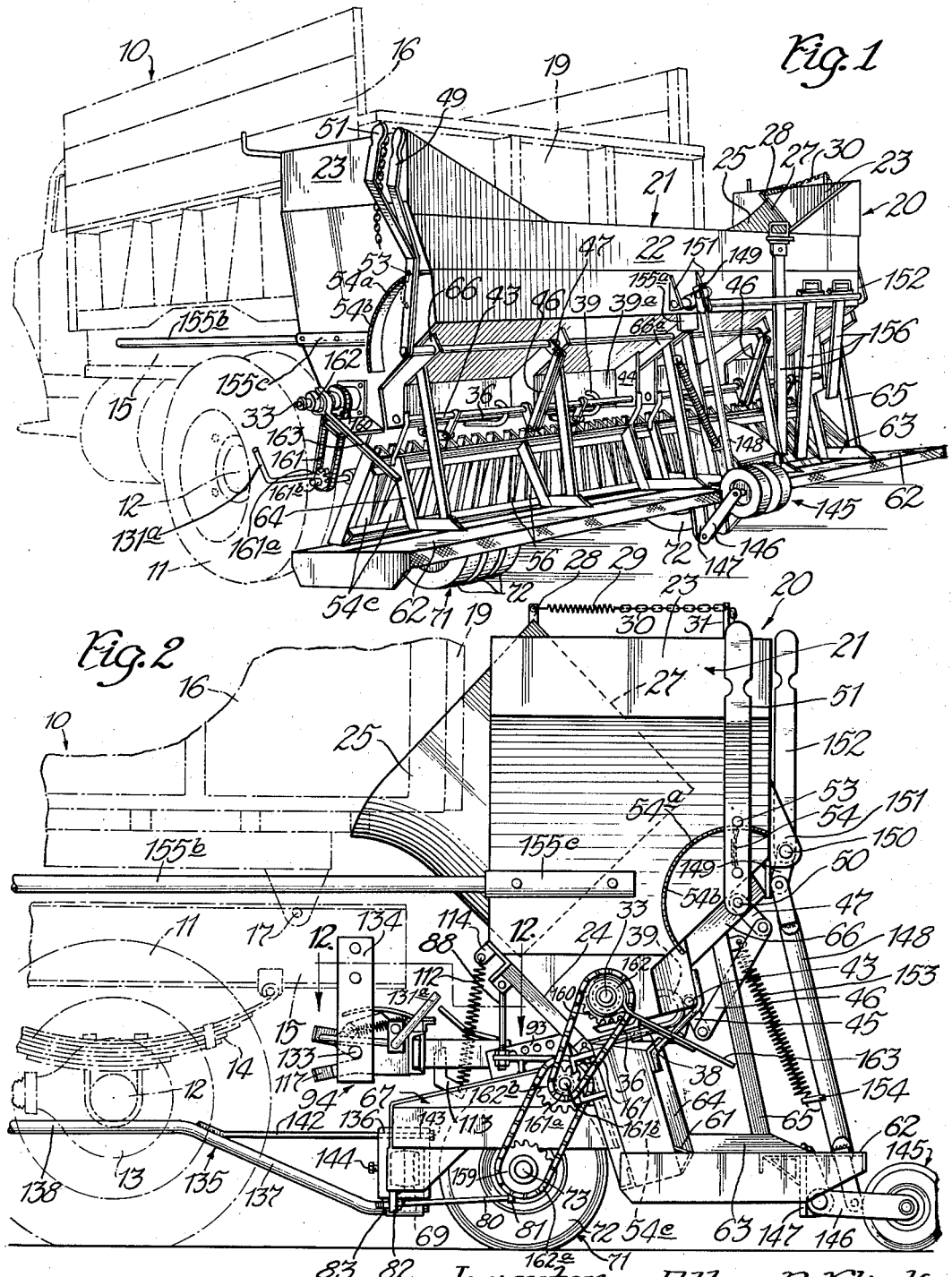
Inventor — Allen R. Flink
by Schnell Brewer
Atty.

Sept. 13, 1955 A. R. FLINK 2,717,783
SELF-SUPPORTING MATERIAL DISTRIBUTING ATTACHMENT
Filed July 23, 1951 7 Sheets-Sheet 2
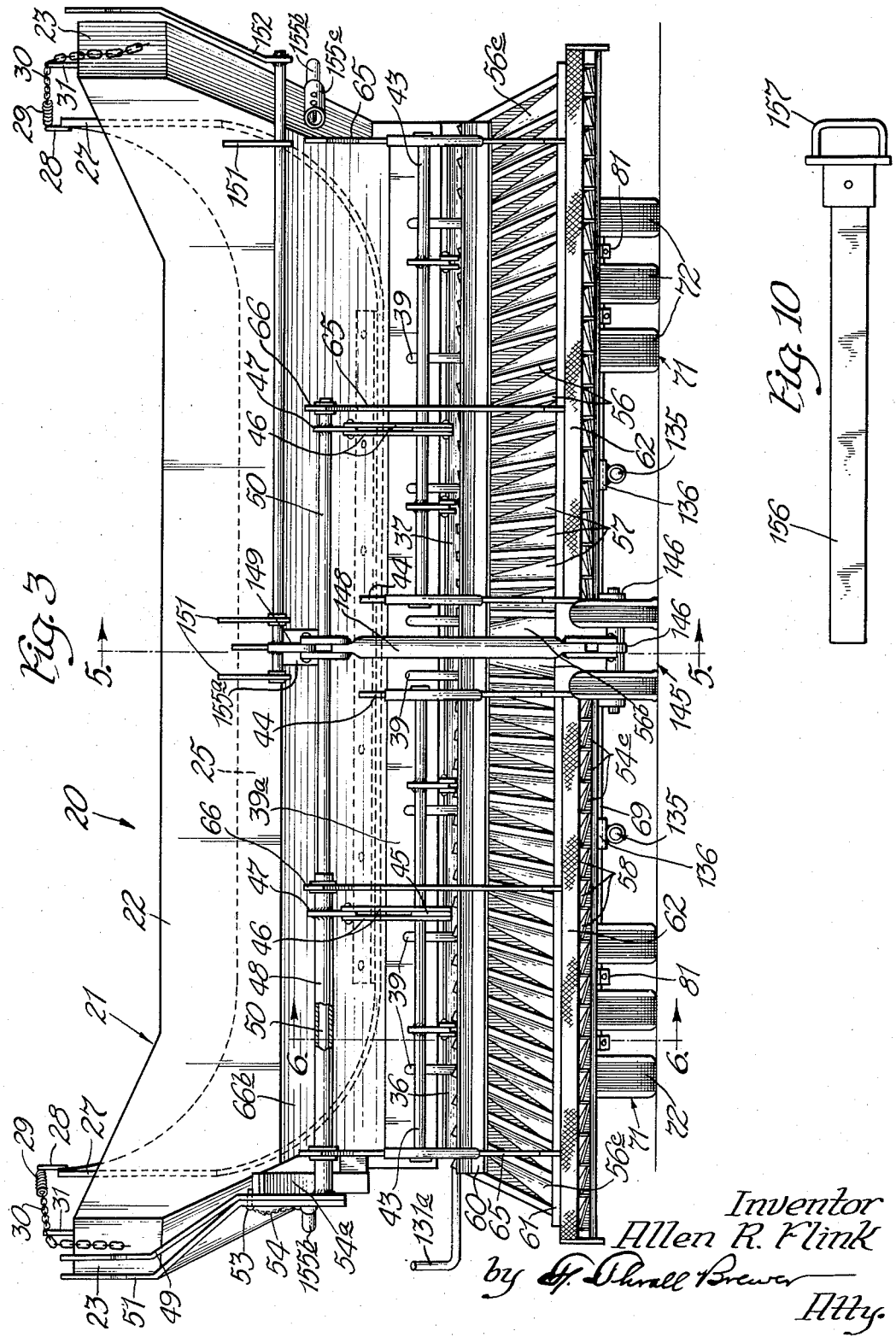
Inventor
Allen R. Flink Sept. 13, 1955  A. R. FLINK  2,717,783
SELF-SUPPORTING MATERIAL DISTRIBUTING ATTACHMENT
Filed July 23, 1951  7 Sheets-Sheet 3
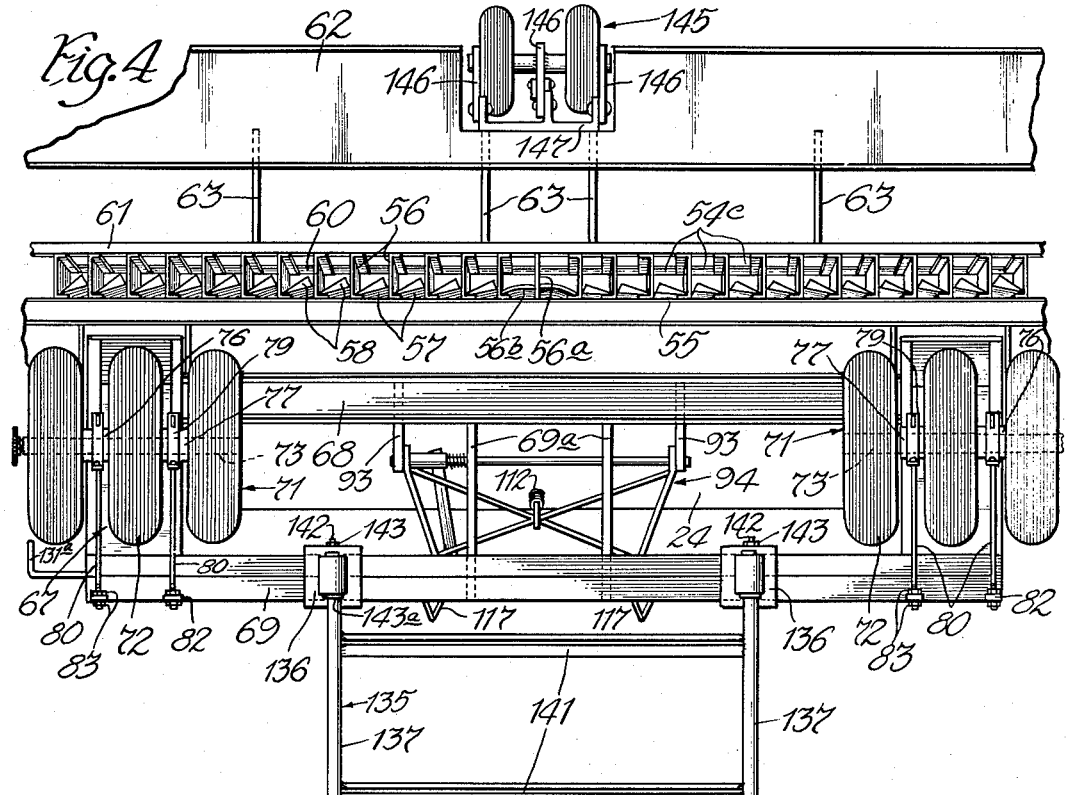
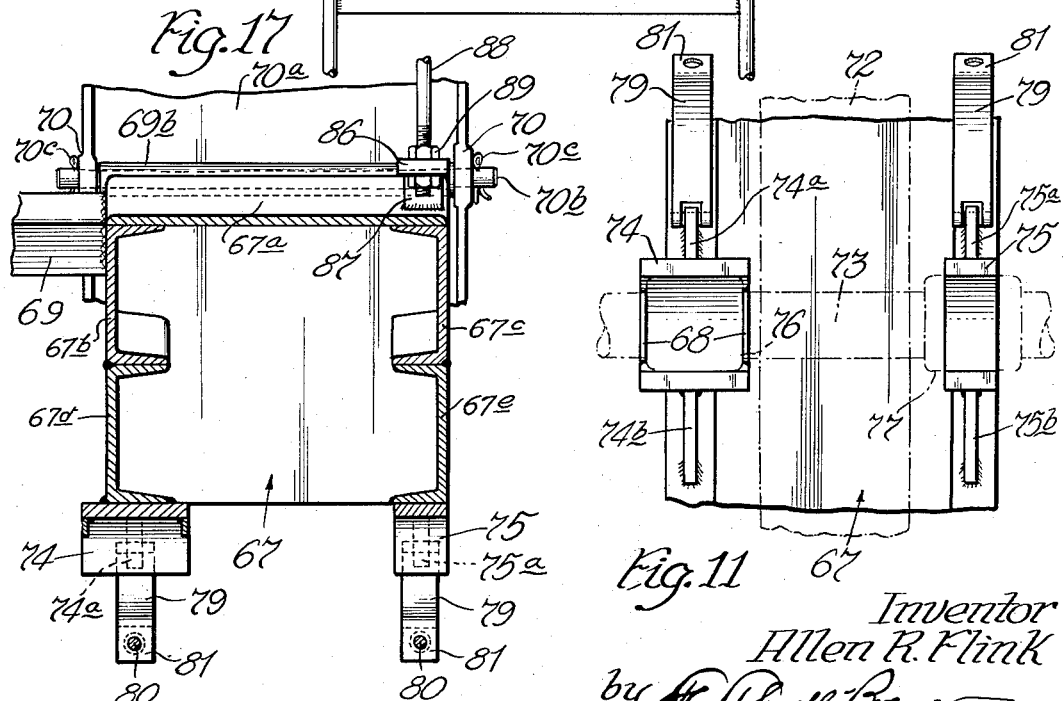
Inventor
Allen R. Flink
by G. Thrall Brewer
Atty.

Sept. 13, 1955  A. R. FLINK  2,717,783
SELF-SUPPORTING MATERIAL DISTRIBUTING ATTACHMENT
Filed July 23, 1951  7 Sheets-Sheet 5
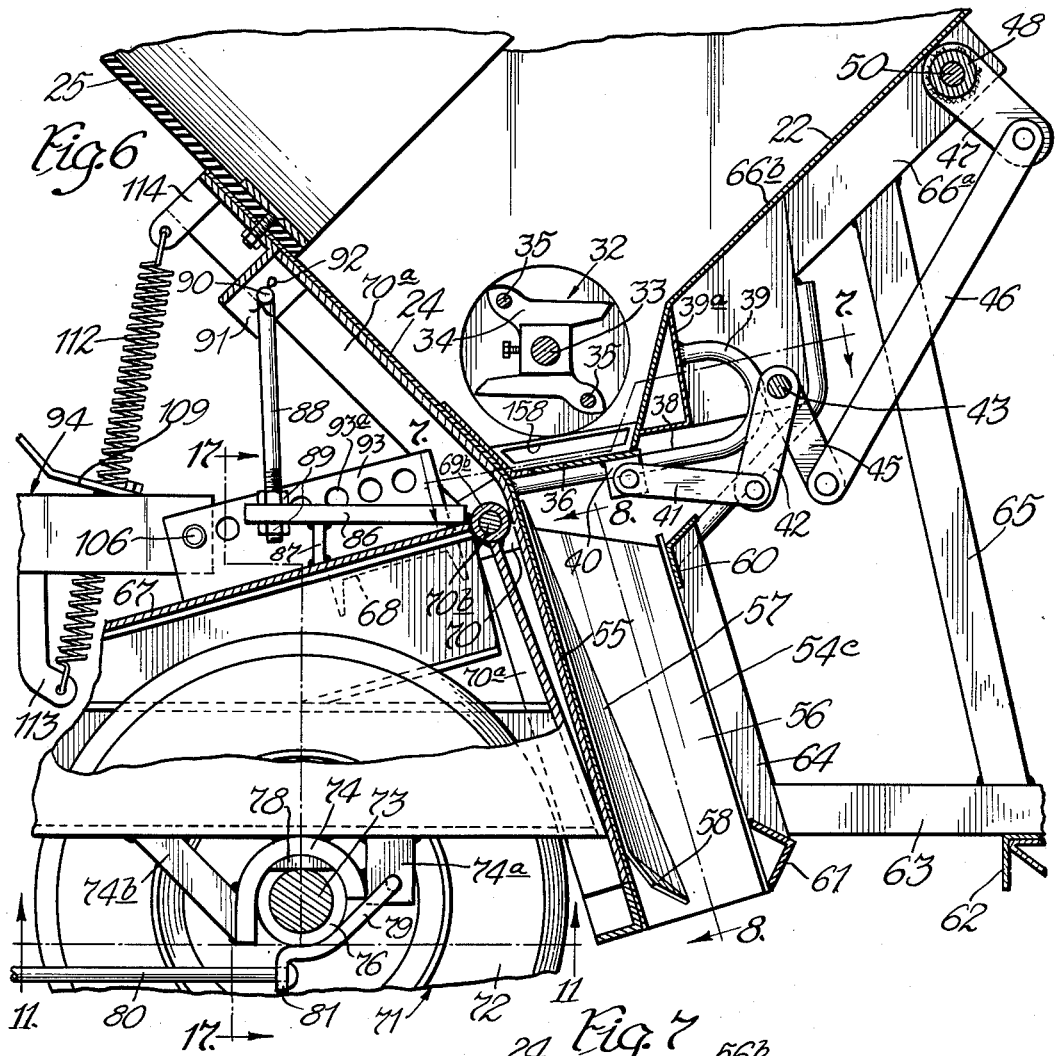
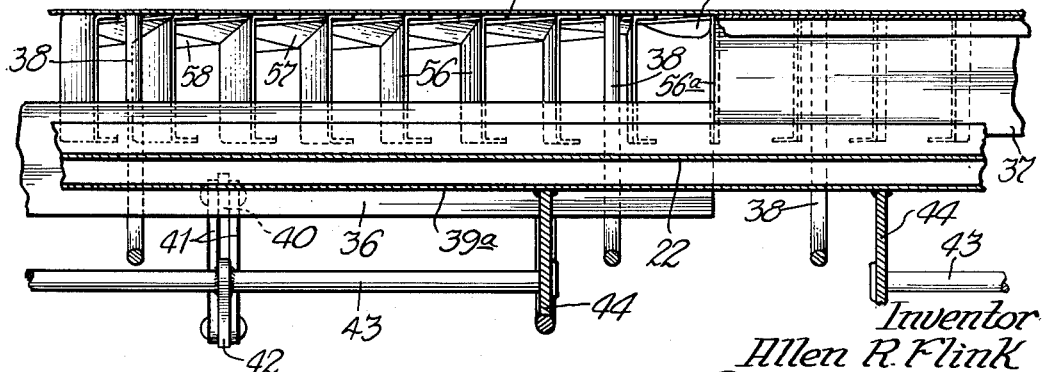
Inventor
Allen R. Flink
by [signature]
Atty.

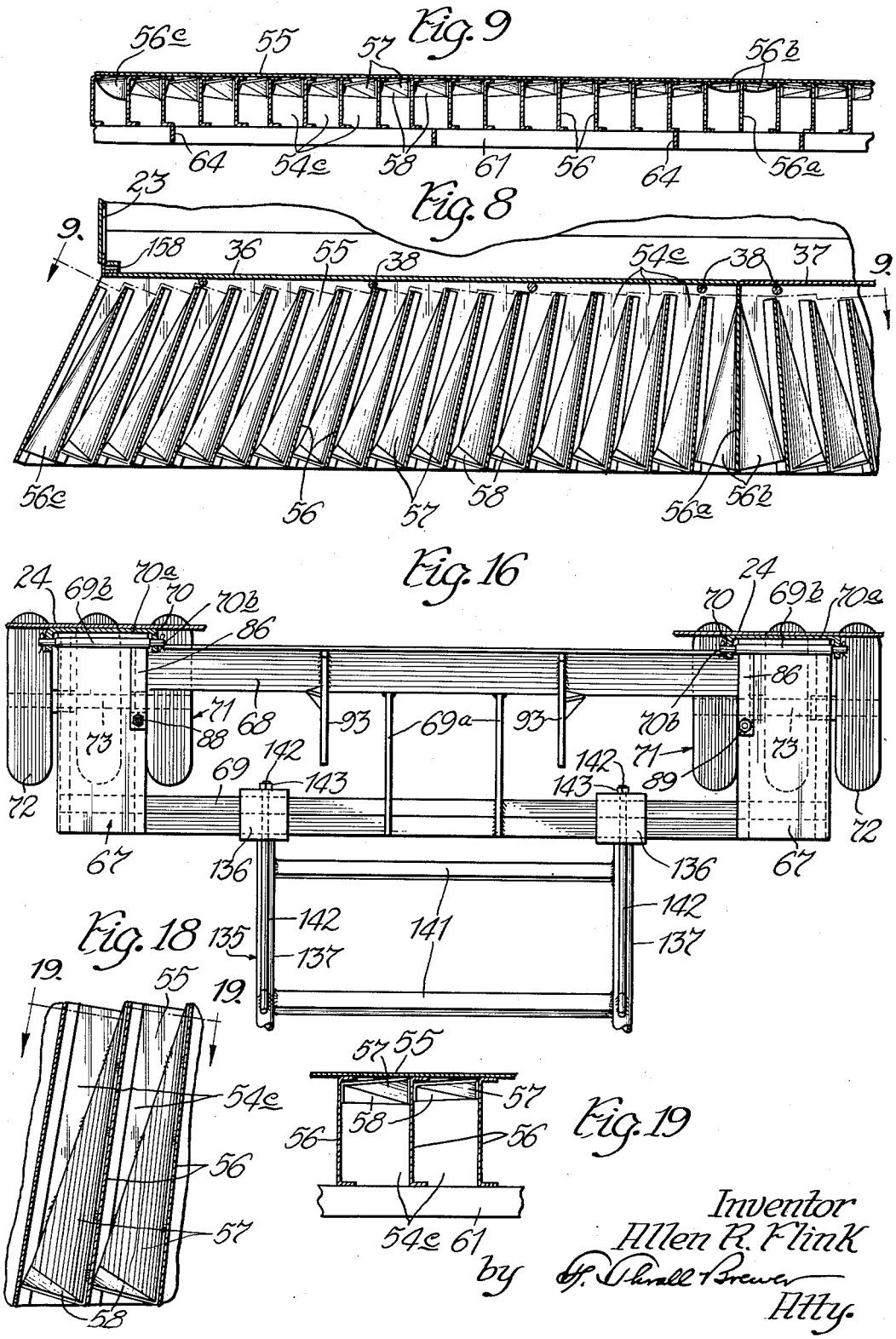

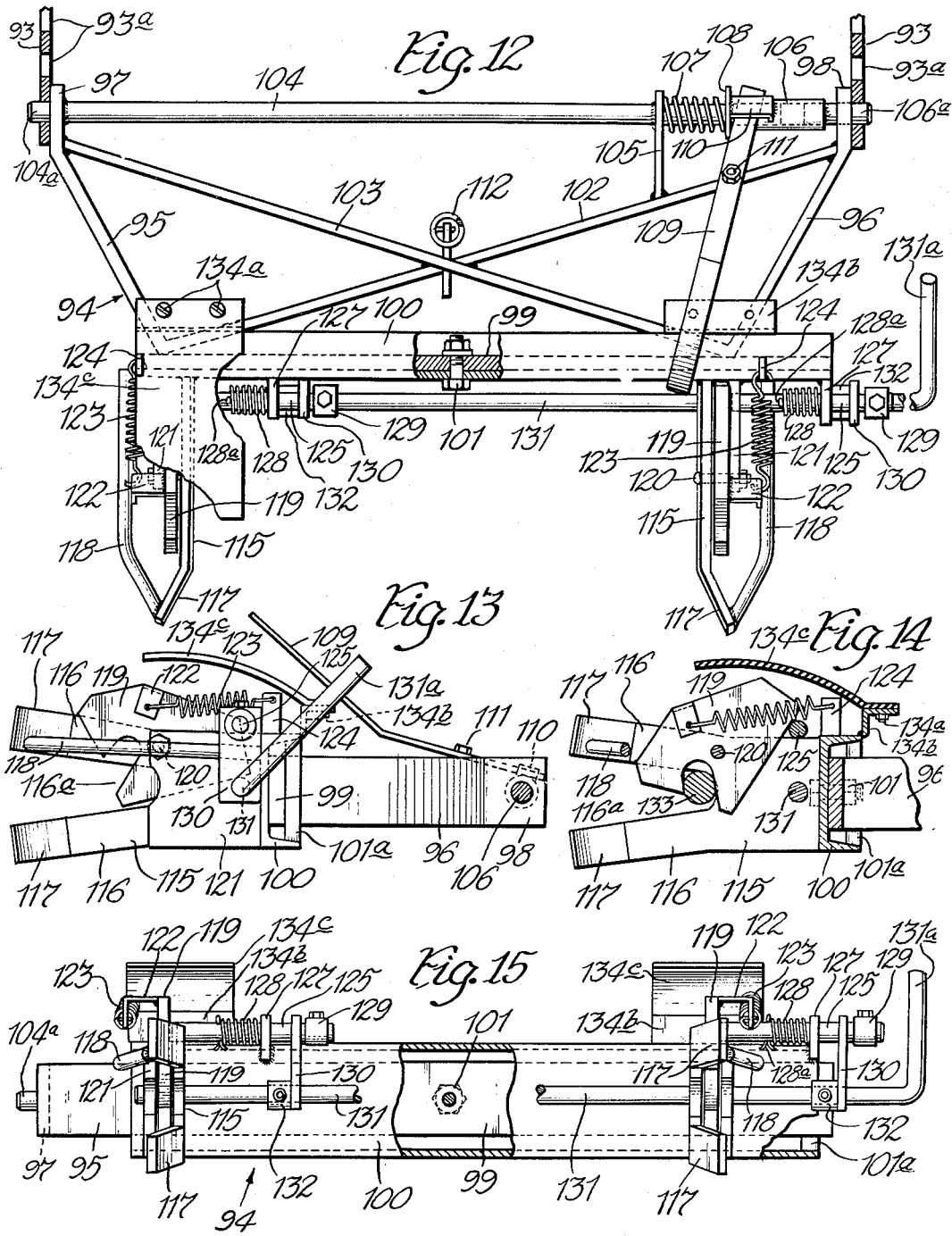

United States Patent Office 2,717,783
Patented Sept. 13, 1955

2,717,783

SELF-SUPPORTING MATERIAL DISTRIBUTING ATTACHMENT

Allen R. Flink, Streator, Ill.

Application July 23, 1951, Serial No. 238,056

11 Claims. (Cl. 275—14)

This invention relates to an attachment for a vehicle, and more specifically, to a self-supported attachment adapted for connection to a truck, which attachment embodies a material dispenser that is capable of handling material received from the truck.

An object of my invention is to provide a self-supporting attachment adapted for use with a truck, which attachment is unstable and cooperates with the truck in such a way as to be prevented from tipping even though connected to the truck by a flexible hitch.

Another object is to provide a flexible hitch for connecting a truck and a self-supporting attachment for the truck, which connection permits a variation in truck height with respect to the attachment. Such variation may occur when the truck rises on its own springs as it is being unloaded into the attachment.

Still another object is the provision of a supplementary ground-engaging means for a truck attachment that would otherwise be unstable when disconnected from the truck.

A still further object is to provide a self-supporting attachment having wheels that are readily detachable.

Another object is the provision of a spreader that receives material at one width and spreads it at a greater width. The spreader is adapted for use as an attachment for a dump truck carrying stone or sand for covering a freshly tarred road. Since the spreader increases the width of the material it spreads, the material received at the width of the dump truck is increased beyond the wheel spread of the dump truck so that the wheels of the truck may run on the road directly after the stone is spread thereon.

A further object is the provision of a spreader that will deposit material evenly and without ridges. This object is accomplished by my invention even when the spreader is composed of inclined chutes which might allow the material to be deposited in ridges.

Still another object is to provide a spreader in which the amount of material deposited varies. For example, one side of the spreader may deposit more material than the other side does. Also the spreader may be regulated so that the width of the material deposited is adjusted.

Other objects and advantages of the invention will be apparent from the following description and the accompanying drawings in which similar characters of reference indicate similar parts throughout the several views.

Fig. 1 is a perspective view of the spreader attachment of my invention taken from the front, and a truck to which the spreader attachment is connected;

Fig. 2 is a side view of the spreader attachment and the rear portion of the truck to which it is connected;

Fig. 3 is a front elevation of the spreader attachment;

Fig. 4 is a bottom view of the spreader attachment;

Fig. 6 is a view of a portion of the spreader attachment partly in side elevation and partly in section, taken generally on the line 6—6 of Fig. 3 in the direction of the arrows;

Fig. 7 is a sectional view taken on the line 7—7 of Fig. 6;

Fig. 8 is a sectional view taken on the line 8—8 of Fig. 6;

Fig. 9 is a sectional view taken on the line 9—9 of Fig. 8;

Fig. 10 is a plan view of a blocking strip employed with the spreader attachment;

Fig. 11 is a partial view taken generally on the line 11—11 of Fig. 6 in the direction of the arrows, showing the manner in which a wheel unit is connected to the supporting structure of the spreader attachment;

Fig. 12 is a plan view partially in section taken generally on the line 12—12 of Fig. 2, showing the hitch employed with the spreader attachment.

Fig. 13 is a side view of the hitch partly in section;

Fig. 14 is a side view of a part of the hitch taken partly in section and with certain parts in a different position from that of Fig. 13;

Fig. 15 is an elevational view of the hitch taken from the end thereof at the bottom of Fig. 12;

Fig. 16 is a plan view of the supporting assembly of the spreader attachment, with a portion of the hopper and chutes shown in section to indicate the mode of attachment of these parts to the supporting assembly;

Fig. 17 is a sectional view taken on the line 17—17 of Fig. 6;

Fig. 18 is a sectional view showing a portion of Fig. 8 on an enlarged scale; and Fig. 19 is a sectional view showing a portion of Fig. 9 on an enlarged scale.

Figure 5:
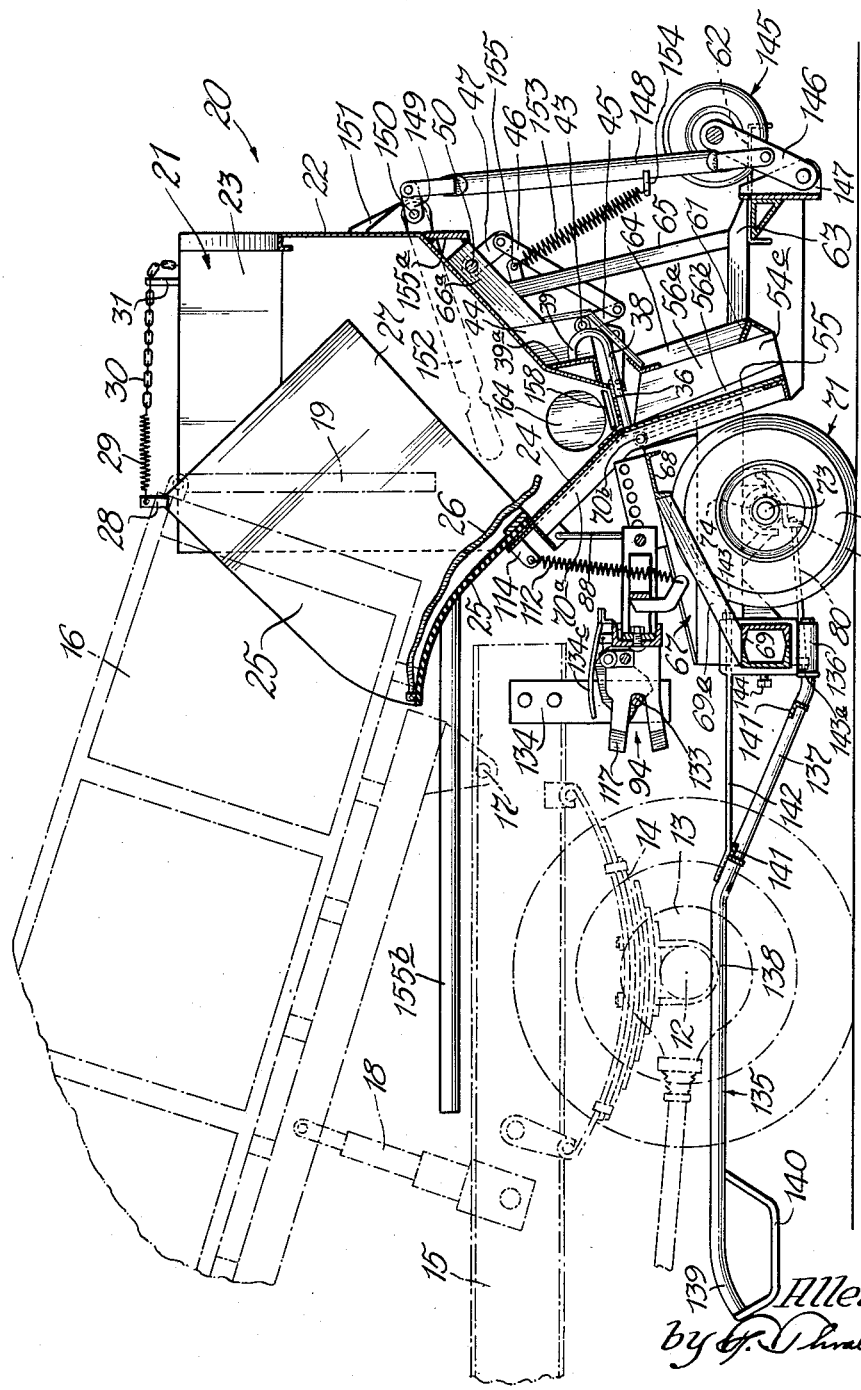
Fig. 5 is a side view of the spreader attachment and the truck to which it is connected, partially in elevation and partially in section and taken generally on the line 5—5 of Fig. 3 in the direction of the arrows.

In Fig. 2 of the accompaning drawings wherein exemplary embodiments of my invention are shown for illustrative purposes, the reference character 10 designates a truck, the rear portion of which is shown in Fig. 2. The truck as shown comprises rear wheels 11, a rear axle housing 12, a differential casing 13, springs 14 secured to the rear axle housing, a frame 15 supported on the rear axle housing by the springs 14, and a dump body 16, which is carried by the frame 15 and arranged to pivot thereon at the point 17. When the dump body is raised to dumping position as shown in Fig. 5 by a suitable device 18, a pivoted tail gate 19 swings open to permit the flow of material out of the dump body 16.

To the rear of the truck 10 there is positioned a spreader attachment 20 of my invention. It is contemplated that during use of the attachment the truck may be backed with the attachment going ahead of the truck. Thus, I shall speak of the end of the attachment away from the truck as the front or forward end, and the end toward the truck as the rear end. However, it is to be understood that the attachment is not limited to being used only when the truck is backed. The spreader attachment comprises a hopper 21 into which material from the dump body of the truck flows. The hopper has a front wall 22 of medium height and high end walls 23. The hopper has a low rear wall 24 to which is clamped a flexible sheet or apron 25 made of a suitable material such as rubber. The sheet 25 is adapted to engage the under portion of the rear of the dump body 16. A chain or cord 26 secured to the outer portion of the sheet generally midway between its ends is manipulated to keep the sheet from buckling under the truck body. The sheet has ends 27 which extend generally forward in the hopper 21 along the end walls 23. Parts 28 are secured to the upper corners of the sheet 25. Springs 29 connect these parts and chains 30, which adjustably engage projections 31 fixed to the hopper end walls 23. Thus the sheet is resiliently and adjustably supported at its ends.

The hopper is narrowed from front to rear at its bottom, and if desirable, because of the quality or properties of material being handled, an agitator 32 may be provided, as in the disclosed structure, which comprises a shaft 33 carried in the ends of the hopper, a plurality of impellers 34 spaced along the length of the shaft, and two material agitating rods 35 extending through the impellers parallel with and on opposite sides of the shaft 33. The agitator 32 is more fully disclosed in Flink Patent 2,359,412 dated October 3, 1944. If the material handled does not require the agitator, it may be omitted as shown in Fig. 5. Below the agitator there is a long transversely extending opening of relatively narrow width.

The width of this opening is adjusted by means of two gates 36 and 37 (Fig. 7), which are arranged end to end, one strip controlling one-half of the opening from one side wall 23 to the middle of the hopper, and the other strip controlling the other one-half of the opening from the middle to the other side of the hopper. The gates 36 and 37 are slidable upon rods 38, which are of round section to provide a minimum of contact with the strips and have hooked upwardly extending ends 39, which are secured to an angle member 39ᵃ secured to the outer side of the front hopper wall 22. The other ends of the rods 38 are secured to the inside of the rear hopper wall 24. As shown in Fig. 6, gate 36 has depending ears 40, to which are connected links 41 which are in turn connected to arms 42 fixed to a shaft 43. The ends (Fig. 1) of the shaft are carried in a hopper side wall 23 and plate 44. An arm 45, which is rigid with the shaft 43, is connected by a pair of links 46 with an arm 47 which is rigid with a tubular shaft 48. This shaft is controlled by an inner lever 49 positioned beyond the left-hand side wall 23 of the hopper as viewed from the front in Figs. 1 and 3. The gate 37 is connected to a similar set of parts except that its associated arm 47 is secured to a solid shaft 50, which extends through the tubular shaft 48 and outer lever 51 which is alongside the inner lever 49 as shown in Figs. 1 and 3 is secured to the solid shaft 50. The levers 49 and 51 may be separately moved to produce separate angular movements of the shafts 48 and 50 and separate adjustment of the gates 36 and 37 through the associated arms, links, and shafts. Thus, there may be one width of the opening below the agitator 32 for one-half of the hopper from one end wall to the middle, and another width of this opening for the other one-half from the middle to the other end wall. The gates 36 and 37 may be secured together at their adjacent ends so that the width of the opening is kept uniform from one side wall of the hopper to the other. The same result may be achieved if the levers 49 and 51 are secured to one another by a pin 53 extending through the levers and carried by a chain 54 on the outer lever 51. An arcuate member 54ᵃ with markings 54ᵇ provides a gage for the effective width of the hopper opening as determined by the plates 36 and 37. The position of the levers 49 and 51 on the arcuate member 54ᵃ indicates the widths of opening.

Attention is now directed to Figs. 7, 8, 9, 18, and 19. Below the gates 36 and 37 there is a plurality of chutes 54ᶜ which causes material falling from the hopper 21 to increase in width. The chutes are formed on a rear wall 55 which slopes downwardly and forwardly as an angular extension of the rear wall 24 of the hopper 21 and has secured thereto a plurality of partitions 56 which define the sides of the chutes, and which chutes are open toward the hopper 21 of the spreader attachment. The rear wall 55 forms the backs of the chutes and the partitions 56 form the sides thereof. The two innermost chutes which open adjacent one another are separated by a member 56ᵃ, which constitutes a common side or partition for the two innermost or central chutes, which side or partition is mounted in substantially perpendicular relationship to the rear wall 55 and normally extends substantially vertically from end to end. The longitudinal parallelism with the common partition, and the variance from such parallelism from the vertical increases progressively from the center common partition toward both sides of the attachment. In each of the two central chutes there is positioned a narrow triangular deflector 56ᵇ having two long sides and one short side, the deflector being bowed laterally of the chute, so that the short side is curved, and being laid against the back of the chute so as to provide it with a convex surface of increasing width toward the lower end of the chute. The same thing is true of a deflector 56ᶜ placed in each of the two outermost chutes. Each of the remaining chutes is provided with a narrow triangular deflector 57 which is not bowed and has two long sides and one short side, the deflector, in each instance, being bent near the short end to provide an angled portion 58 of triangular shape which projects out into the chute at the bottom end thereof. Each of the deflectors 56ᵇ, 56ᶜ and 57 is positioned in a chute 54ᶜ, so that the vertex of the two long sides is in the corner of the open upper end of the chute adjacent the chute back and toward the center of the attachment. One long side of each deflector extends downwardly along the chute back (rear wall 55) from the upper end of the chute to a position laterally across the chute and near the bottom thereof. The other long side of each deflector extends along the face of the adjacent channel partition 56 on the side thereof remote from the center of the attachment and from the vertex to a position somewhat outwardly from the back wall. Furthermore, the positions of the deflectors are varied from the center toward the sides of the attachment so that the bottom ends extend farther out across the channel partitions 56 and the angles of those bottom ends face more toward the outside of the attachment as the distance from the center of the attachment increases toward both sides.

Because of the somewhat radial aspect of the chute walls from the center to the outsides, the chutes are somewhat narrower at their tops than at their lower ends. The upper widths of the chutes, except for those beneath the rods 38 which carry the gates 36 and 37, are, in the disclosed structure, practically equal. The widths of the lower ends of the chutes, except for those beneath the rods 38, increase by very small amounts from one chute to the next outwardly from the central chutes. Thus except for the chutes beneath the rods 38, the effective width or the width measured perpendicularly to either side increases with the distance from the central chute. Consequently deflectors with gradually increasing lengths of short sides can be used to make the one long side of each deflector reach regions on the inner chute sides spaced from the chute backs by increasing distances. The long sides of the deflectors increase in length from one chute to the next outwardly of the central chutes because of the increase in length of the chutes due to increase in departure of the chute sides or channels 56 from the vertical. The chutes beneath the rods 38 are greater in upper lower widths than they would be without the rods present, because of the obstruction these rods provide.

The purpose of the deflectors in the chutes is to prevent material delivered from the chutes from being piled in ridges. The deflectors spread the material more completely across the chutes and deliver the material to the ground or road so that material from one chute overlaps that of the adjacent chute and prevents the formation of ridges in the material as deposited. The tilt of the deflectors is made to increase from the central chutes outwardly to overcome the increasing tendency of the material to follow the inner sides of the chutes, which is due to the increasing deviation of the inner sides from the vertical. The deflectors in the outermost chutes are convex and have no angled portions at their lower ends so that the tendency for the material to be thrown outward of the chutes is materially reduced. The deflectors in the central chutes are convex and without angled portions at their lower ends, since the deflectors would otherwise throw the material outward in different directions, leaving a hollow or gap in the material deposited below the central vertical wall 56ª.

The front sides of the chutes are open and are bridged and reinforced by angle members 60 and 61 which extend across the width of the spreader attachment. A platform 62 for the operator extends across the chutes at their lower ends and is supported by pieces 63 secured to members 64 bridging the angle members 60 and 61 and by straps 65 depending from brackets 66 and 66ª, which are secured to a rearwardly sloping portion 66ᵇ of the front wall 22 and to angle member 39ª. The brackets 66 and 66ª support the gate-adjusting shafts 48 and 50.

The hopper 21 and the chutes 54ᶜ are carried on two hollow structures 67 (Figs. 2, 4, 5, 16, and 17), each constituting a top plate 67ª secured to the opposed side channels 67ᵇ and 67ᶜ, which side channels intersect lower and additional side channels 67ᵈ and 67ᵉ to form an acute angle therebetween. The hollow structures are secured in spaced relation to one another by means of a channel beam 68 and a box beam 69 formed of two channels. Braces 69ª extend between the beams. Two spaced aligned transversely extending tubes 69ᵇ are secured at the forward upper corners of the hollow structures 67. Each tube fits between two reinforced portions 70 on the sides of vertical channels 70ª, which reinforce the rear hopper wall 24 and the chute wall 55. Rods 70ᵇ extend through the tubes 69ᵇ and the reinforced portions 70 to join the hopper 21 and associated chutes to the hollow structures 67, which together with the beams 68 and 69 which connect the hollow structures form a support. The rods 70ᵇ are held in place by cotter pins 70ᶜ. Each hollow structure 67 is carried upon a wheel unit 71 formed of three aligned wheels 72 mounted on a common axle 73 (Fig. 4). The hollow structures partially enclose the center wheels of the wheel units. Each hollow structure 67 has on its underside two mountings 74 and 75, which as shown for the mountings 74 in Fig. 6 half embrace bearing collars 76 and 77 on the wheel axle 73. The mountings are appropriately secured to the hollow structures by means that comprise supplemental pieces 74ª and 74ᵇ for mounting 74 as seen in Figs. 6 and 11 and supplemental pieces 75ª and 75ᵇ for mounting 75 as seen in Fig. 11. The mounting 74 has projections 78 at opposite sides which engage the ends of the wheel collar 76 to prevent axial shifting of the wheel unit 71 in the hollow structures 67. A strap 79 is pivotally connected to each of the supplemental pieces 74ª and 75ª of the mountings and engages the lower sides of each of the collars 76 and 77 to hold the wheel units securely against the hollow structures 67. The straps 79 are held in place by long bolts 80 which extend through flanges 81 on the straps 79 (Fig. 17) and through projections 82 at the lower rear corner of the box beam 69 (Figs. 2 and 4). The bolts 80 are threaded at their ends extending through the projections 82 and receive nuts 83 which are accessible and therefore easily loosened when a wheel unit is to be replaced, as may be required when air pressure is lost in a tire on one of the wheels of the unit. In that event a jack is placed under the rear beam 69 near the wheel unit to be removed, and the unit is removed as aforesaid.

The center of gravity of the hopper 21 and the chutes 54ᶜ is positioned forward of the connecting rods 70ᵇ or to the right as viewed in Fig. 6. Thus the hopper and chutes tend to pivot clockwise around the rods 70ᵇ which connect the hopper and chutes to the supporting structure. Consequently, the lower front portions of the hollow structures 67 contact the bases of the channels 70ª, as shown in Fig. 6. Each hollow structure 67 carries a strap 86 which has one end secured directly to the hollow structure adjacent the tube 69ᵇ and the other end spaced from the hollow structure by a member 87. Said other end of the strap 86 receives the threaded end of an L-bolt 88, being fixed thereon by nuts 89 threaded to opposite sides of the strap. Head 90 of the L-bolt extends through angle member 91 secured to the outer face of the rear hopper wall 24. A cotter pin 92 retains the bolt head 90 in the angle member 91. The upper nuts 89 are screwed down on the L-bolts to place the bolts under compression and prevent the lower edges of the front faces of the hollow structure 67 from moving out of contact with the bases of the channels 70ª.

The channel 68 (Fig. 16) carries transversely spaced longitudinal flanges 93 each having a series of holes 93ª (Fig. 6) extending along the flange. These flanges serve for the connection of a floating hitch 94 shown in Figs. 12 to 15. This hitch comprises two side members 95 and 96 which have parallel portions 97 and 98 at the forward ends and converge rearwardly from those forward ends. The rear ends of the side members 95 and 96 are secured to a transverse member 99 to which is pivotally connected a channel 100 by a bolt 101. The transverse member 99 lies within the channel 100, and relative pivotal movement between the channel and the member about the bolt is limited by contact between the channel and the member. The member 99 is also retained on the channel 100 by pieces 101ª secured inside the channel at its ends. Two parts 102 and 103 secured to one another in X-relation brace the side members 95 and 96. A rod 104 extends through and is secured to the end portion 97 of the side member 95. The rod thus provides a projection 104ª, which engages one of the openings 93ª in the left-hand flange 93. The other end of the rod 104 extends through and is secured to a piece 105 secured to the brace member 102. A tubular section 106 is slidably mounted on the end of the rod 104 and carries a retractible projection 106ª extending through the end portion 98 and the side member 96. A spring 107 acting between the piece 105 and a collar 108 secured to the sleeve 106 urges the sleeve and its projection 106ª to the right as viewed in Fig. 12 to maintain the said projection in one of the openings 93ª of the left-hand flange 93. The projection 106ª is releasable from the flange opening that it engages, by actuation of a lever 109 which has one end fitting within a holder 110 secured to the sleeve 106 and collar 108 and is pivotally mounted at 111 on the brace member 102. The hitch 94 is floatingly supported by a spring 112 which is attached at its lower end to a member 113 secured in depending relation adjacent to the crossing place of the brace members 102 and 103 and at its upper end to a bracket 114 secured at the upper end of the rear wall 24 of the hopper.

A pair of members 115 is secured adjacent the ends of the channel 100 at the outer flat side thereof. The end of each channel member 115 away from the channel is split and flared so as to be formed with jaws 116 defining a receiving recess 116ª. The ends of the jaws 116 have angle portions 117 so that the jaws flare from one another at the portion 117 as seen in Figs. 13 and 14. Each upper angled portion 117 is reinforced by a bent rod 118 which extends in parallel spaced relation to the rest of the member 115 to the channel, where it is secured. A holding piece 119 is pivotally mounted at 120 on each jaw member 116, and a parallel member 121 secured to the beam 100, and lies between the members 115 and 121. The holding piece 119 has a lug 122 which anchors one end of a spring 123, the other end of which is anchored in a projection 124 on the top of the channel 100. Associated with each holding piece 119 is a locking rod 125 which is carried in a bracket 127 secured to the channel 100. A spring 128, which is positioned on the rod 125 and acts between the bracket 127 and a cotter pin 128ª through the rod 125, urges the rod to the left as viewed in Fig. 12. A collar 129 is secured on the end of rod 125, and a member 130 through which the rod 125 freely extends, lies between the collar 129 and the bracket 127. A long control rod 131, which has a handle 131a freely extends through both members 130. Fixed collars 132 on the control rod are adjacent the members 130.

The spring 123 tends to keep each holding piece 119 in the position of Fig. 13. In this position the end of the associated locking rod is urged against the side of the holding piece 119 by its spring 128. However, when the holding piece 119 is moved counter-clockwise to the position shown in Fig. 14, for example, by movement into the jaws 116 of a draft member 133, which is carried by depending members 134 on the truck frame 15 (Fig. 2), the holding piece 119 because of its shape has moved out of the path of the associated locking members 125, which now under the action of its spring 123 moves across the edge of the holding piece 119 to block clockwise angular movement of the holding piece 119 from the position of Fig. 14. Thus, the truck draw bar 133 is locked in place. Since the holding pieces 119 are independent of one another and are controlled by independent locking rods 125, the truck bar 133 need not be locked in both pairs of jaws 116 at the same time. Release of the truck draw bar 133 from the jaws is made to occur simultaneously, by movement of the control rod 131 to the right as viewed in Figs. 12 and 15. The collars 132 on the control bar move the members 130 to the right, which in turn move the collars 129 and the locking rods 125 to the right. Thus, these rods are shifted out of the paths of the holding plates 119, and their springs 123 return the plates to the position of Fig. 13 so that the truck draw bar 133 is released.

Thus the hitch 94 is pivotally connected at its forward end by the projections 104a and 106a in the holes 93a on the flanges 93 on the spreader attachment, and at its rear end to the truck draw bar 133. Because of these pivotal connections the truck may move vertically with respect to the spreader attachment without adverse effect on the hitch connection between them. Such vertical movement of the truck and more particularly of the truck draw bar 133 to which the hitch is connected may occur as the truck body 16 is being dumped into the spreader attachment 20, and the decrease in weight upon the truck springs 14 causes the truck body and the draw bar 133 to rise. The hitch is adjustable with respect to the spreader attachment, since the projections 104a and 106a can be inserted in the series of holes 93a in the flanges 93. This adjustment compensates for variation in the position of the truck-body pivot 17 with respect to the end of the truck body 16, so that the hopper 21 is properly placed with respect to the end of the truck body as it dips into the hopper during dumping.

The hitch 94 is easily adjusted with respect to the spreader attachment. The projection 106a is retracted from the right-hand flange 93 by actuation of the lever 109. Then the hitch, being supported on the spreader attachment by the spring 112 is easily tilted, so that the projection 104a is removed from the left-hand flange 93. Then the hitch is moved along the flanges 93 to a new suitable location; the hitch is tilted for insertion of the fixed projection 104a in a new opening 93a in the left-hand flange 93; and the retractable projection 106a is shifted by the lever 109 to permit the right side of the hitch 94 to be dropped into a position in which the projection 106a may enter a new opening 93a in the right-hand flange 93.

The pivoting of the member 99 in the channel 100 on the bolt 101, all of which are hitch parts, permits the spreader attachment to rock laterally with respect to the truck.

Flexible covers 134c are provided over the jaw members 116 and the holding members 119 to keep material from the truck and spreader attachment from getting between these members. They are secured by bolts 134a to angle members 134b secured to the top forward edges of the channel 100.

As previously stated, the center of gravity of the hopper 20 and the chutes 54c is forward of the pin 70b which connects the hopper and chutes to the wheeled structure and thus is forward of the wheel axle 73. So the spreader attachment tends to tilt forwardly and this is prevented by a novel construction that will now be described. As shown in Figs. 4 and 5, a pair of tubular members 135 are carried at their forward ends in fittings 136 which embrace the box beam 69 and are slidable therealong so as to be shiftable transversely of the spreader attachment. The tubular members extend rearwardly from the beam, first slightly upwardly as indicated at 137 and then horizontally as indicated at 138, and terminate in rear ends 139 which curve down slightly. Members 140 are secured to the rear ends to give them a blunt shape that will prevent the tubular members from digging into the ground or roadway in the event that the truck and spreader attachment pass over a hollow or a rise. Spaced angle members maintain the tubular members 135 in fixed spaced parallel relation. Bracing pieces 142 are secured to the tubular members at the rear ends of the inclined portions 137 and extend through the fittings 136 above the beam 69, terminating in forward threaded ends that receive nuts 143 which prevent the members 135 from moving rearwardly out of the fittings 136. Flanges 143a on the tubular members 135 contact the fittings 136 and thus prevent the tubular members from moving forward.

The tubular members 135 are adapted to straddle the differential housing 13 of the truck, with the horizontal portion 138 of the tubular members pressing upward against the rear-axle housing 12 to prevent the spreader attachment from tipping forwardly. The tubular members 135 are conjointly shiftable laterally of the spreader attachment by sliding of the fittings 136 along the box beam 69 so as to straddle the differential housing 13 regardless of its relative lateral position between the truck wheels 11. The tubular members can also straddle other obstructions beneath the truck such as hydraulic equipment for lifting the truck body 16 to dumping position. Screws 144, threaded into the fittings 136, may be tightened against the box beam 69 to hold the tubular members against lateral shifting with respect to the spreader attachment.

At the front of the spreader attachment there is a double-wheel unit 145, which is swingably mounted on three arms 146, which are hingedly connected to a bracket 147. The bracket is secured in a recess at a mid portion of the platform 62. The two outer arms 146 are on the outer sides of the wheels, and the middle arm is between them. A link 148 has a lower bifurcated end that straddles and is connected to the middle link, and an upper bifurcated end that is similarly connected to an arm 149 fixed to a shaft 150. The shaft is mounted in brackets 151 secured to the front wall 22 of the hopper and extends to the right side of the hopper as viewed from the front in Fig. 3. At the right of the hopper a control lever 152 is secured to the shaft 150. A spring 153, which has ends anchored on a lug 154 on the link 148 and a lug 155, holds the wheel attachment 145 in engagement with the ground or road as shown in Fig. 2 or in raised position as shown in Fig. 5. In the position of Fig. 2 the spring urges the arm 149 against a plate 155a on the end of the bracket 66a and holds the arm and the link 148 in over-center relation. The control lever is employed to move the wheel attachment between these positions.

When the spreader attachment is adjacent the truck, the tubular members 135 press upward against the axle housing 12 to prevent the spreader attachment from tipping forward. When the attachment is to be moved away from the truck, the wheel unit 145 is shifted downward to the position of Fig. 2, and the spreader attachment is made stable.

When the spreader attachment and the truck are to be connected with one another, the apron 25 is lowered by release of the chains 30 from the projections 31. Now the truck and the attachment are brought together with the edge of the apron 25 going beneath the bottom of the truck body 16. The truck draw bar 133 enters the jaw members 116, shifting the holding pieces 119 from the position of Fig. 13 to that of Fig. 14, in which the locking rods 125 have moved past the edges of the holding pieces to keep them in the position of Fig. 14. The spreader attachment has tubular rods 155ᵇ bolted in sleeves 155ᶜ secured on the hopper side walls 23. The attachment may be pushed or pulled by these rods so as to be brought into the right position for connection to the truck. Then the apron is brought tight against the truck body, as shown in Fig. 2, by pulling on the chains 30 to tension the springs 29 and dropping of suitable chain links over the projections 31 as shown. Now the truck body 16 may be tilted to dumping position as shown in Fig. 5, the material in the truck body flowing into the hopper 21.

The spreader attachment of my invention is well suited to spreading crushed stone, gravel, or sand over a freshly tarred road. In this event the truck will be backed, pushing the spreader attachment ahead of it. The truck body 16 will be tilted as in Fig. 5 so that the hopper 21 will be filled. The wheel unit 145 will be raised, since the members 135 by contact with the truck axle housing 12 prevents the spreader attachment from tipping, and it would be undesirable to have the wheel unit 145 run on the freshly tarred road. The stone, sand, or gravel flows down through the chutes 54ᶜ onto the tar on the road ahead of the wheel units 71 and the truck wheels 11, which will run over the covered part of the road, not on the tar itself, since the chutes 54ᶜ cover a greater width than the wheel units 71 or the truck wheels 11. One or more operators standing on the platform 62 can watch the flow of material onto the tarred road and regulate such flow by adjustment of the gates 36 and 37 through manipulation of the levers 49 and 51. Since the gates are independent, the flow can be of different weights for the two halves of the spreader attachment. The effective width of the attachment can be reduced by the insertion of blocking strips 156 having handles 157, as shown in Fig. 10. Three such strips of varying lengths are shown in Fig. 1, carried between the front wall 22 of the hopper and the shaft 150. The strips may be inserted through openings 158 in the side walls 23 of the hopper just above the gates 36 and 37. Since the strips are inserted lengthwise, they may be inserted while material is flowing from the hopper 21 into the chutes 54ᶜ. The blocking strip may be moved in and out as the truck and spreader attachment move along so that a varying width of deposited material can be obtained. This may be required where the width of the road changes or there is a curved edge on the road as at a road intersection.

The agitator 32 is driven from one of the wheel units 71 by a gear 159 rotatable with this unit, a gear 160 on the agitator shaft 33, a chain 161 meshing with the gear 160 and a gear 161ᵃ on a countershaft 161ᵇ, a clutch 162 between the gear 160 and the agitator shaft, and a chain 162ᵃ meshing with the gear 159 and a gear 162ᵇ on the countershaft 161ᵇ. The clutch is disengaged by a lever 163. When the agitator 32 is not present in the spreader attachment as shown in Fig. 5, openings in the side walls 23 of the hopper are covered by plates 164.

The spreader attachment will function just as well if it follows the truck as the latter is driven forward. However, the attachment is well suited to operation in which the wheel units of the attachment and the wheels of the backing truck travel over material just spread, since the chutes 54ᶜ are arranged to deposit material over a greater width than the width of the truck body 16 and the hopper 21.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A spreader attachment comprising a wheeled support carrying a pair of aligned tubes at a forward upper corner and spaced laterally of the attachment, a pair of straps secured to the support and extending from adjacent the said forward upper corner with the spacing from the top of the support increasing with the distance from the said forward upper corner, a spreader comprising a hopper and a plurality of chutes positioned at the front of the support and having two channels thereon straddling the aligned tubes, rods passing through the tubes and the sides of the channels, said rods being rotatable in said tubes to provide an axis for forward and rearward tilting movements of the hopper and chutes relative to the support, L-bolts having threaded ends passing through the straps and heads extending through the spreader at regions spaced from the tubes, and nuts engaging the threaded ends of the L-bolts and the straps so as to determine the position of the hopper and chutes relative to the support and normally to maintain lower portions of the front of the support in engagement with the bases of the channels.

2. A spreader attachment comprising a wheeled support including a frame having pin-receiving portions at one upper corner, a hopper-and-chute assembly having at the juncture of the hopper and chutes pin-receiving elements secured thereto for placement in aligned relation with the pin-receiving portions on the support, pins extending through said portions and providing an axis of rocking movement of the hopper and chutes relative to the support, adjustable supporting means acting between the hopper portion of the assembly and the support at regions spaced from the pin-receiving portions to assure contact between the chute portion of the assembly and the support at other regions spaced from the pin-receiving portions.

3. A spreader attachment comprising a wheeled support, and a dispenser assembly mounted on the wheeled support to be carried thereby and including a plurality of downwardly extending chutes in aligned relationship transversely of the support to form a row of chutes having a greater combined width at their lower end than at their upper end, and said wheeled support having a hitch thereon for connecting the spreader attachment to a truck positioned at the opposite side of the wheeled support from the chutes, the two center chutes of the row having a common partition in the vertical plane passing through the central longitudinal axis of the spreader, the chutes to one side of one of the center chutes being inclined outwardly from parallelism in one direction to the said vertical partition, and the chutes at the other side of the other center chute being inclined outwardly from parallelism with said partition in the opposite direction to the said vertical partition, the inclined chutes having triangular deflectors secured in the back portions of the chutes to spread the flow of material therein and thereby to even the distribution of the material deposited from the various chutes so as to prevent ridges in the deposited material, and the triangular deflectors being mounted in the backs of the chutes at varying angles and positions to provide portions of the backs of the chutes which tilt outwardly and increase in width from the tops to the bottoms of the chutes.

4. A spreader attachment as specified in claim 3, and wherein the chutes increase in inclination outwardly from parallelism to the said vertical partition from one chute to the next in a direction away from the said common partition, and the angles of the tilted portions of the backs of the chutes provided by the deflectors increase from one chute to the next in a direction away from the said common partition.

5. A spreader including a plurality of chutes arranged in a transverse row and having downwardly inclined backs and laterally inclined side walls, said side walls being respectively disposed relative to one another so that they deviate from parallelism to a central side wall in both directions longitudinally of the row and outwardly from the central side wall and progressively increase in such deviation from one chute to the next, and a plurality of triangular deflectors secured in the chutes in positions angularly related to the chute backs, effectively to provide a tilt to portions of the backs of the chutes in each direction from the central side wall the angular relationships of the triangular deflectors to the chute backs progressively changing from one chute to the next so as to cause the tilt in said portions of the chute backs effectively to increase progressively with deviation of the sides from parallelism with the adjacent chute wall.

6. A spreader as defined in claim 5, the deflectors having end portions at the bottoms of the chutes which project outwardly from the chute backs and are angularly disposed with respect to the remainders of the deflectors.

7. A spreader as defined in claim 5, the triangular deflectors being disposed in the chutes so that the widths of the tilted portions of the chute backs increase from top to bottom of the chutes.

8. A spreader as defined in claim 5, the deflectors being in the form of long narrow triangles having two long sides and one short side, one long side extending downwardly along the chute back from one side wall toward the other and the other long side extending downwardly along said one side from the back to a region spaced from the back.

9. A spreader as defined in claim 5, the deflectors being in the form of long narrow triangles having two long sides and one short side, one long side extending downwardly along the chute back from one side wall toward the other and the other long side extending downwardly along said one side from the back to a region spaced from the back, the said other long side of the deflectors extending along the said one side wall of each of the chutes with the spacing thereof from the back wall increasing from one chute to the next with the increase of deviation of the side walls from parallelism with the central chute wall, whereby a tilt is given to portions of the chute backs by the deflectors which increases from one chute to the next longitudinally of the row and outwardly from the center.

10. A spreader comprising a plurality of chutes arranged in a line and having inclined backs, a channel partition of two center chutes being in the vertical plane passing through the central longitudinal axis of the spreader, the other channel partitions thereof and the channel partitions of the remaining chutes deviating downwardly and outwardly from parallelism with the common channel partition of said center chutes in amounts increasing with distance from the said central common channel partition, the deviation from the plane of said central common channel partition being in one direction to one side of the common center channel partition and in the other direction to the other side of the common center channel partition, the chutes being provided with triangular deflectors, the deflectors in the two center chutes and the two outermost chutes being convex, one edge of each deflector extending downwardly along the back of a chute from the side nearer the said common channel partition toward the other channel partition and another edge extending downwardly along the said nearer channel partition from the chute back to a region spaced from the chute back, the spacing of the said region from the chute back increasing with distance of the chute back from the common center channel partition.

11. A spreader as defined in claim 10, each deflector except the two in the two center chutes and the two in the two outermost chutes having at its bottom margin a portion extending outwardly from the chute back in angular relationship with respect to the remainder of the deflector.

References Cited in the file of this patent

UNITED STATES PATENTS

| Number | Name | Date |
|---|---|---|
| 35,916 | Beach | July 22, 1862 |
| 413,544 | Peace et al. | Oct. 22, 1889 |
| 757,777 | Sackett | Apr. 19, 1904 |
| 1,332,006 | Schadt et al. | Feb. 24, 1920 |
| 1,644,575 | Fitz Gerald | Oct. 4, 1927 |
| 1,678,585 | Conlon | July 24, 1928 |
| 1,854,575 | Baumgardner | Apr. 19, 1932 |
| 1,915,864 | Nabors | June 27, 1933 |
| 1,994,672 | Smith | Mar. 19, 1935 |
| 2,005,896 | Hurt | June 25, 1935 |
| 2,059,548 | Broome | Nov. 3, 1936 |
| 2,085,895 | Broome | July 6, 1937 |
| 2,185,062 | Patterson | Dec. 26, 1939 |
| 2,252,690 | Arndt | Aug. 19, 1941 |
| 2,252,691 | Arndt | Aug. 19, 1941 |
| 2,309,086 | Arndt | Jan. 26, 1943 |
| 2,360,901 | Simmons | Oct. 24, 1944 |
| 2,388,308 | Court | Nov. 6, 1945 |
| 2,522,693 | Stiteler | Sept. 19, 1950 |
| 2,525,506 | Wiedman | Oct. 10, 1950 |
| 2,543,288 | Hoffstetter | Feb. 27, 1951 |
| 2,568,445 | Grattan | Sept. 18, 1951 |